Sept. 19, 1950     A. E. SPEER     2,522,692
RETRIEVER
Filed March 3, 1947
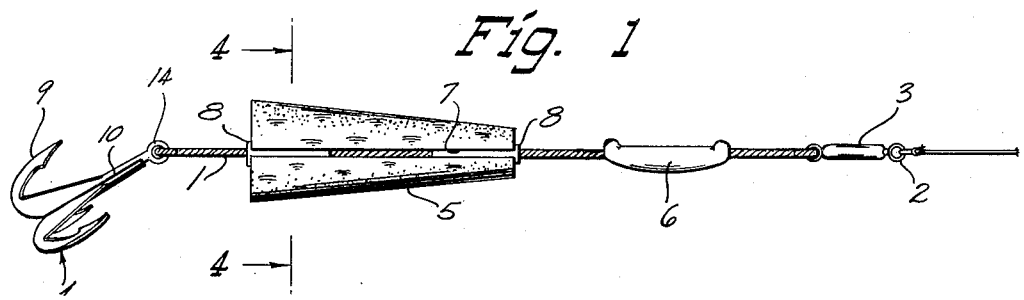
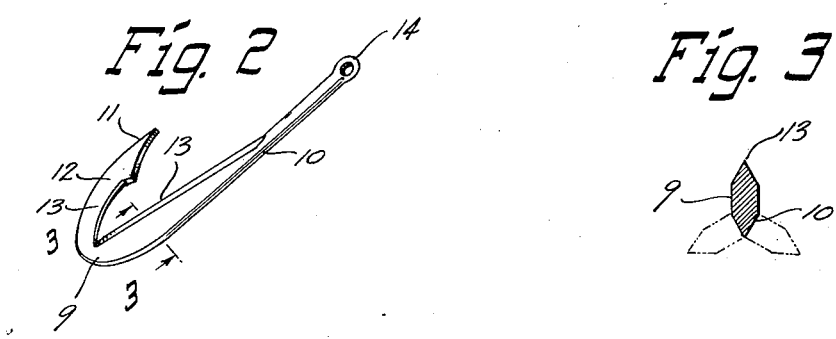 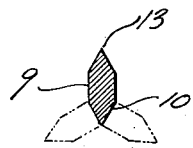
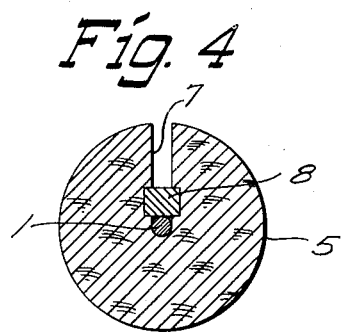
INVENTOR
Arthur E. Speer
BY
ATTORNEY Patented Sept. 19, 1950

2,522,692

UNITED STATES PATENT OFFICE 2,522,692

RETRIEVER

Arthur E. Speer, Milwaukee, Wis.

Application March 3, 1947, Serial No. 732,051

1 Claim. (Cl. 294—66)

This invention relates to devices for retrieving game shot down in water, weed beds or the like.

An object of the invention is to provide a device adapted to be thrown or cast with a fishing rod and reel to engage the carcass of the game to be recovered and which will cut through lily pads or other weeds and will not readily become snagged or entangled by the weeds or other growth in which the game may have been shot down.

Another object of the invention is to provide a device having a plurality of grapple hooks which will not become fouled or caught on weeds or the like and will more readily free itself of any such weeds or growth with which the hooks may become entangled.

These and other objects and advantages of the invention will become apparent from the following description of a preferred embodiment of the invention as illustrated in the accompanying drawings.

In the drawings:

Figure 1 is a side elevational view of the complete device;

Figure 2 is a detailed perspective view of one of the hooks of the grapple;

Fig. 3 is a cross-sectional view through the hook taken on line 3—3 of Fig. 2; and Fig. 4 is a cross-sectional view of the float device taken on line 4—4 of Fig. 1.

The retriever comprises, in general, a relatively stiff cable 1, an eye 2 at one end of the cable 1, a connecting swivel 3 with a grapple hook 4 at the other end thereof, and a float 5 and sinker 6 mounted on and along the length of the cable 1.

Cable 1 may comprise a common fishing leader and should be about eight or ten inches long and of substantial weight and strength. Leader 1 is tied to the end of a strong casting line by the eye 2.

Float 5 is of wood, cork or other suitable buoyant material and is shaped in the form of a cone or conical frustrum. A longitudinal slit 7 extends half-way through the cone diametrically to the central axis of the float for receiving cable 1. The float 5 is mounted on the leader 1 with its smaller end toward the forward end of the leader and is secured thereon by means of plugs 8 which are inserted into the slit 7 at each end of the float to wedge the leader 1 within the slit. If desired, a hole may be substituted for the slit to extend through the center of the float and through which the cable 1 may be passed.

Float 5 should be at least about four inches long and of adequate width to provide for the protection of the grapple to be described.

Sinker 6 is of the ordinary fishing lead and is mounted on leader 1 between the float 5 and the forward end of the leader to keep the device in a substantially horizontal position and the hooks from sinking too low in the water. The sinker is preferably of the long split type with tapered body and ends which avoid catching on weeds.

Three hooks 9 are integrally formed or joined together at their shanks 10 to form the three pronged grapple 4. Single hooks or other multiple hooks may be employed as desired.

Each hook has a long sharp end 11 preferably provided with an enlargement 12 at its base. The backside of the main hook is beveled to fit the corresponding backsides of the other two hooks and to be brazed or soldered together as desired.

Along the inside curve of each hook is a cutting edge 13 which extends from barb 12 to the bottom of the hook and then straight for a substantial distance up the shank of each hook. The edge 13 should be sufficiently sharp to cut through weeds which may become caught or entangled on the hooks.

The enlargement 12 should be blunt on its sides and need not be hooked as in the ordinary fish hook barb since it serves to prevent sufficient piercing of the game to a point where the cutting edge 13 might damage the same. The point of barb 12 should be long.

The end of leader 1 is looped through an eye 14 at the top of grapple 4 to flexibly secure the same on the leader.

The retriever may be employed with a casting rod and reel, not shown, or may be thrown by hand where practicable. The retriever is secured to the end of the casting line by eye 2 and when a duck or other game is to be recovered from a distance the device is cast or thrown over the game and then drawn in so that the grapple engages and a hook pierces the carcass of the game and the same may then be recovered.

When the game to be recovered is lying in a weed bed or the like the float in being drawn through the weeds in front of the grapple serves to provide a path therethrough for the grapple so that weeds will not readily foul the same. Weeds which become entangled on the hooks are severed by the cutting edge on each hook as the retriever is drawn through the weeds. The float is movable upon the leader by removing the plugs and should be adjusted so that the float and the grapple will lie in a generally horizontal line.

Various embodiments of the invention may be employed within the scope of the accompanying claim.

I claim:

A retriever grapple comprising a plurality of hooks extending at different angles from a common shank, each hook having a long pointed end with an enlargement for determining the penetration thereof into an object to be retrieved, and a sharp cutting edge on the inner curve between the enlargement and the shank to provide for cutting of any weeds and the like with which the grapple may become entangled.

ARTHUR E. SPEER.

REFERENCES CITED

The following references are of record in the file of this patent:

UNITED STATES PATENTS

| Number | Name | Date |
| --- | --- | --- |
| 913,440 | Sutton | Feb. 23, 1909 |
| 989,392 | Mueller | Apr. 11, 1911 |
| 2,157,003 | Mussina | May 2, 1939 |
| 2,157,819 | Eckert | May 9, 1939 |
| 2,220,559 | Voigt | Nov. 5, 1940 |

FOREIGN PATENTS

| Number | Country | Date |
| --- | --- | --- |
| 25,212 | Great Britain | Oct. 30, 1897 |